(12) United States Patent
Bittel et al.

(10) Patent No.: US 6,820,173 B1
(45) Date of Patent: Nov. 16, 2004

(54) DATA PREFETCHER WITH PREDICTOR CAPABILITIES

(75) Inventors: Donald A. Bittel, San Jose, CA (US); Colyn S. Case, Grass Valley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 267 days.

(21) Appl. No.: 09/791,417

(22) Filed: Feb. 23, 2001

(51) Int. Cl.$^7$ .............................................. G06F 12/00
(52) U.S. Cl. ....................................... 711/137; 711/213
(58) Field of Search ................................. 711/137, 410, 711/167, 169, 213; 712/235, 237, 239

(56) References Cited

U.S. PATENT DOCUMENTS

| | | | |
|---|---|---|---|
| 6,157,976 A | * 12/2000 | Tien et al. ................... | 710/314 |
| 6,253,288 B1 | * 6/2001 | McAllister et al. ......... | 711/137 |
| 6,438,673 B1 | * 8/2002 | Jourdan et al. ............. | 711/213 |
| 6,449,698 B1 | * 9/2002 | Deshpande et al. ......... | 711/137 |
| 6,480,939 B2 | * 11/2002 | Anderson et al. ........... | 711/137 |
| 6,523,093 B1 | * 2/2003 | Bogin et al. ................ | 711/137 |
| 6,567,901 B1 | * 5/2003 | Neufeld ....................... | 711/158 |

* cited by examiner

*Primary Examiner*—Matthew Kim
*Assistant Examiner*—Woo H. Choi
(74) *Attorney, Agent, or Firm*—Zilka-Kotab, PC (57) ABSTRACT

A system, method and article of manufacture are provided for retrieving information from memory. Initially, processor requests for information from a first memory are monitored. A future processor request for information is then predicted based on the previous step. Thereafter, one or more speculative requests are issued for retrieving information from the first memory in accordance with the prediction. The retrieved information is subsequently cached in a second memory for being retrieved in response to processor requests without accessing the first memory. By allowing multiple speculative requests to be issued, throughput of information in memory is maximized.

33 Claims, 10 Drawing Sheets

DATA PREFETCHER WITH PREDICTOR CAPABILITIES

FIELD OF THE INVENTION

The present invention relates to accessing memory, and more particularly to reducing latency while accessing memory.

BACKGROUND OF THE INVENTION

Figure 1:
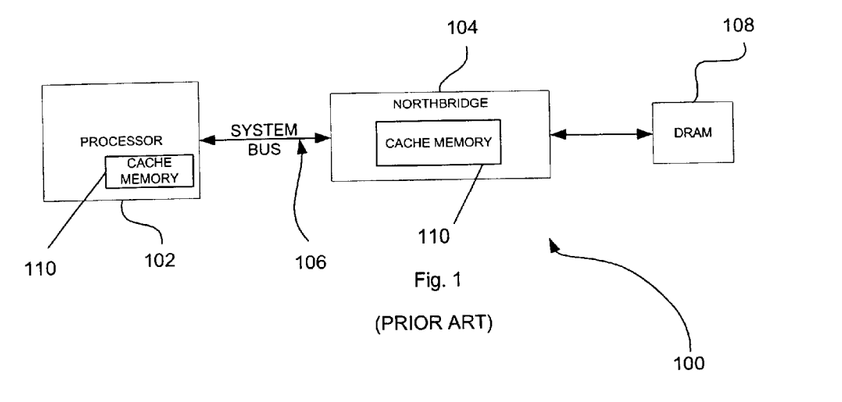
FIG. 1 illustrates one exemplary prior art architecture that relies on conventional techniques of accessing information in memory.

Prior art FIG. 1 illustrates one exemplary prior art architecture that relies on conventional techniques of accessing information in memory. As shown, a processor 102 is provided which is coupled to a Northbridge 104 via a system bus 106. The Northbridge 104 is in turn coupled to dynamic random access memory (DRAM) 108. In use, the processor 102 sends requests to the Northbridge 104 for information stored in the DRAM 108. In response to such requests, the Northbridge 104 retrieves information from the DRAM 108 for delivering the same to the processor 102 via the system bus 106. Such process of calling and waiting for the retrieval of information from the DRAM 108 often causes latency in the performance of operations by the processor 102. One solution to such latency involves the utilization of high-speed cache memory 110 on the Northbridge 104 or the processor 102 for storing instructions and/or data.

Cache memory has long been used in data processing systems to improve the performance thereof. A cache memory is a relatively high speed, relatively small memory in which active portions of program instructions and/or data are placed. The cache memory is typically faster than main memory by a factor of up to ten or more, and typically approaches the speed of the processor itself. By keeping the most frequently accessed and/or predicted information in the high-speed cache memory, the average memory access time approaches the access time of the cache.

The need for cache memory continues even as the speed and density of microelectronic devices improve. In particular, as microelectronic technology improves, processors are becoming faster. Every new generation of processors is about twice as fast as the previous generation, due to the shrinking features of integrated circuits. Unfortunately, memory speed has not increased concurrently with microprocessor speed. DRAM technology rides the same technological curve as microprocessors, technological improvements yield denser DRAMs, but not substantially faster DRAMs. Thus, while microprocessor performance has improved by a factor of about one thousand in the last ten to fifteen years, DRAM speeds have improved by only 50%. Accordingly, there is currently about a twenty-fold gap between the speed of present day microprocessors and DRAM. In the future this speed discrepancy between the processor and memory will likely increase.

Caching reduces this large speed discrepancy between processor and memory cycle times by using a fast static memory buffer to hold a small portion of the instructions and/or data that are currently being used. When the processor needs a new instruction and/or data, it first looks in the cache. If the instruction and/or data is in the cache (referred to a cache "hit"), the processor can obtain the instruction and/or data quickly and proceed with the computation. If the instruction and/or data is not in the cache (referred to a cache "miss"), the processor must wait for the instruction and/or data to be loaded from main memory.

Cache performance relies on the phenomena of "locality of reference". The locality of reference phenomena recognizes that most computer program processing proceeds in a sequential fashion with multiple loops, and with the processor repeatedly accessing a set of instructions and/or data in a localized area of memory. In view of the phenomena of locality of reference, a small, high speed cache memory may be provided for storing data blocks containing data and/or instructions from main memory which are presently being processed. Although the cache is only a small fraction of the size of main memory, a large fraction of memory requests will locate data or instructions in the cache memory, because of the locality of reference property of programs.

Unfortunately, many programs do not exhibit sufficient locality of reference to benefit significantly from conventional caching. For example, many large scale applications, such as scientific computing, Computer-Aided Design (CAD) applications and simulation, typically exhibit poor locality of reference and therefore suffer from high cache miss rates. These applications therefore tend to run at substantially lower speed than the processor's peak performance.

In an attempt to improve the performance of a cache, notwithstanding poor locality of reference, "predictive" caching has been used. In predictive caching, an attempt is made to predict where a next memory access will occur, and the potential data block of memory is preloaded into the cache. This operation is also referred to as "prefetching". In one prior art embodiment prefetching includes retrieving serially increasing addresses from a current instruction. Serial prefetchers such as this are commonly used in a number of devices where there is a single data stream with such serially increasing addresses.

Unfortunately, predictive caching schemes may often perform poorly because of the difficulty in predicting where a next memory access will occur. Performance may be degraded for two reasons. First, the predicting system may inaccurately predict where a next memory access will occur, so that incorrect data blocks of memory are prefetched. Prefetching mechanisms are frequently defeated by the existence of multiple streams of data. Moreover, the prediction computation itself may be so computationally intensive as to degrade overall system response.

One predictive caching scheme attempts to dynamically detect "strides" in a program in order to predict a future memory access. See, for example, International Patent Application WO 93/18459 to Krishnamohan et al. entitled "Prefetching Into a Cache to Minimize Main Memory Access Time and Cache Size in a Computer System" and Eickemeyer et al. "A Load Instruction Unit for Pipeline Processors", *IBM Journal of Research and Development*, Vol. 37, No. 4, July 1993, pp. 547–564. Unfortunately, as described above, prediction based on program strides may only be accurate for highly regular programs. Moreover, the need to calculate a program stride during program execution may itself decrease the speed of the caching system.

Another attempt at predictive caching is described in U.S. Pat. No. 5,305,389 to Palmer entitled "Predictive Cache System". In this system, prefetches to a cache memory subsystem are made from predictions which are based on access patterns stored by context. An access pattern is generated from prior accesses of a data processing system processing in a like context. During a training sequence, an actual trace of memory accesses is processed to generate unit patterns which serve in making future predictions and to identify statistics such as pattern accuracy for each unit pattern. Again, it may be difficult to accurately predict performance for large scale applications. Moreover, the need to provide training sequences may require excessive overhead for the system.

DISCLOSURE OF THE INVENTION

A system, method and article of manufacture are provided for retrieving information from memory. Initially, processor requests for information from a first memory are monitored. A future processor request for information is then predicted based on the previous step. Thereafter, one or more speculative requests are issued for retrieving information from the first memory in accordance with the prediction. The retrieved information is subsequently cached in a second memory for being retrieved in response to processor requests without accessing the first memory. By allowing multiple speculative requests to be issued, throughput of information in memory is maximized.

In one embodiment of the present invention, a total number of the prediction and/or processor requests may be determined. As such, the speculative requests may be conditionally issued if the total number of the requests exceeds a predetermined amount. As an option, the speculative requests may be conditionally issued based on a hold or cancel signal. To this end, the hold and cancel signals serve as a regulator for the speculative requests. This is important for accelerating, or "throttling," operation when the present invention is under-utilized, and preventing the number of speculative requests from slowing down operation when the present invention is over-utilized.

In another embodiment of the present invention, the step of predicting may include determining whether the future processor request has occurred. Accordingly, the predicting may be adjusted if the future processor request has not occurred. More particularly, the predicting may be adjusted by replacing the predicted future processor request. As an option, a miss variable may be used to track whether the future processor request has occurred. By tracking the miss variable and replacing the predicted future processor request accordingly, a more efficient prediction system is afforded.

In still another embodiment of the present invention, a confidence associated with the future processor request may be determined. Further, the speculative requests may be issued based on the confidence. More particularly, the confidence may be compared to a confidence threshold value, and the speculative requests may be issued based on the comparison. As an option, a confidence variable may used to track the confidence. Moreover, the confidence threshold value may be programmable. As such, a user may throttle the present invention by manipulating the confidence threshold value. In other words, the total amount of speculative requests issued may be controlled by selectively setting the confidence threshold value.

In still yet another embodiment of the present invention, it may be determined whether the information in the second memory has been retrieved by the processor requests. Subsequently, the information may be replaced if the information in the second memory has not been retrieved. Similar to before, a variable may be used to track whether the information in the second memory has been retrieved by the processor requests.

In various aspects of the present invention, the processor requests may be monitored in multiple information streams. Further, the information may include graphics information. Still yet, the first memory may include dynamic random access memory (DRAM), and the second memory may include cache memory.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior art

DESCRIPTION OF THE PREFERRED EMBODIMENTS

Figure 2:
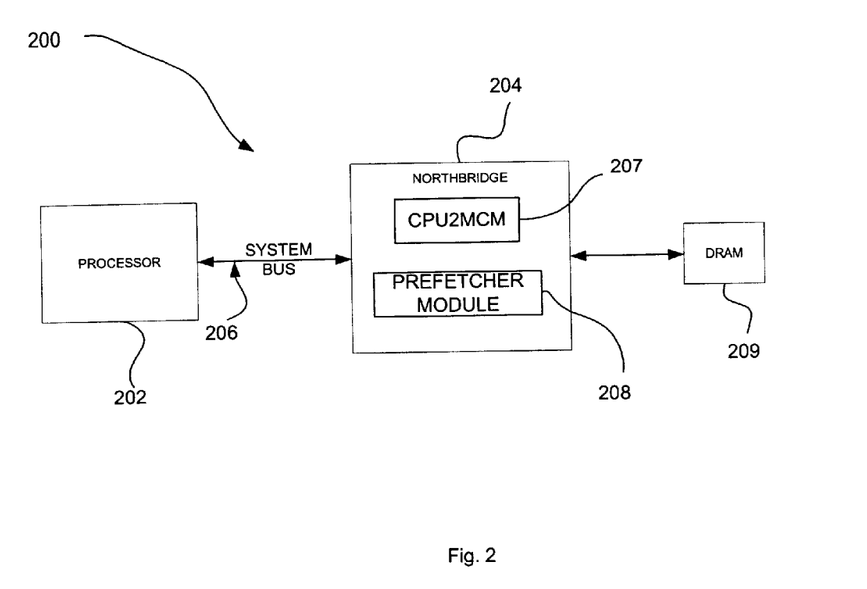
FIG. 2 illustrates an architecture that utilizes improved caching techniques to efficiently access information in memory, in accordance with one embodiment of the present invention.

FIG. 1 illustrates the prior art. FIG. 2 illustrates an architecture 200 that utilizes improved caching techniques to efficiently access information in memory, in accordance with one embodiment of the present invention. As shown, a processor 202 is provided which is coupled to a Northbridge 204 via a system bus 206. The Northbridge 204 is in turn coupled to dynamic random access memory (DRAM) 209.

Positioned on the Northbridge 204 is a central processor unit memory control module (CPU2MCM) 207, and a prefetcher module 208. In operation, the prefetcher module 208 utilizes improved techniques for allowing the memory controller 207 to more efficiently cache information retrieved from the DRAM 209. This, in turn, reduces any latency associated with the performance of operations by the processor 202. Further information regarding the operation of the memory controller 207 and prefetcher module 208 will be set forth hereinafter in greater detail.

Figure 3:
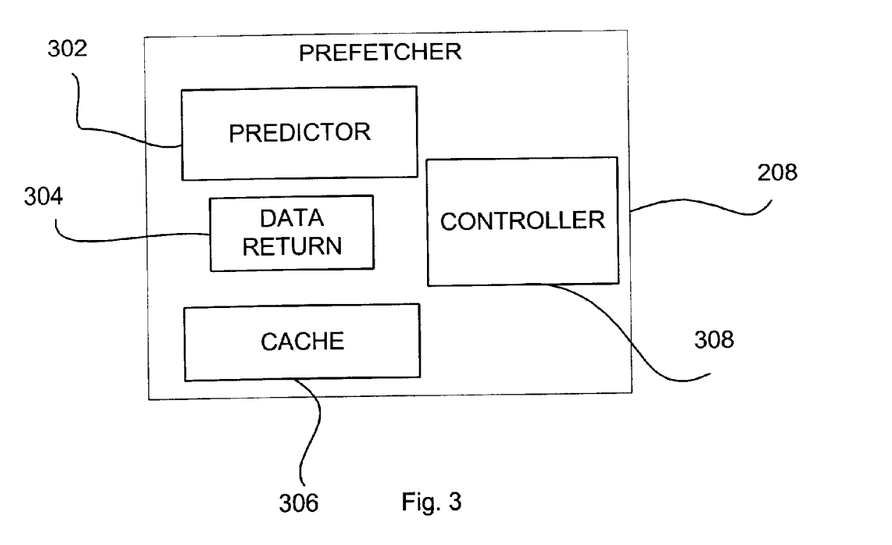
FIG. 3 is a schematic diagram showing in more detail the inner workings of the prefetcher module of FIG. 2.

FIG. 3 is a schematic diagram showing in more detail the inner workings of the prefetcher module 208 of FIG. 2. As shown, the prefetcher module 208 includes a predictor module 302 for predicting future processor requests for information made by the processor 202, and issuing speculative requests to the DRAM 209 upon a prediction being made. Further provided is a cache memory 306 for storing the retrieved information. It should be noted that the cache memory 306 may be located in any desired location. In the present description, the term request refers to any action that the ultimately causes the retrieval of information from memory, where the information may include instructions, data, or any other entity stored in the memory. It should be further noted that the requests may originate from any desired location.

Also included as a component of the prefetcher module 208 is a data return module 304 for tagging the information retrieved from the DRAM 209, and sending the same to the processor 202 when it is actually requested. The data return module 304 may further monitor the success of the predictions made by the predictor module 302. This is accomplished utilizing a data structure that will be set forth during reference to FIG. 4. Further included is a control module 308 for controlling the overall operation Of the prefetcher module 208. Additional information regarding the operation of the foregoing components will be set forth hereinafter in greater detail.

Figure 4:
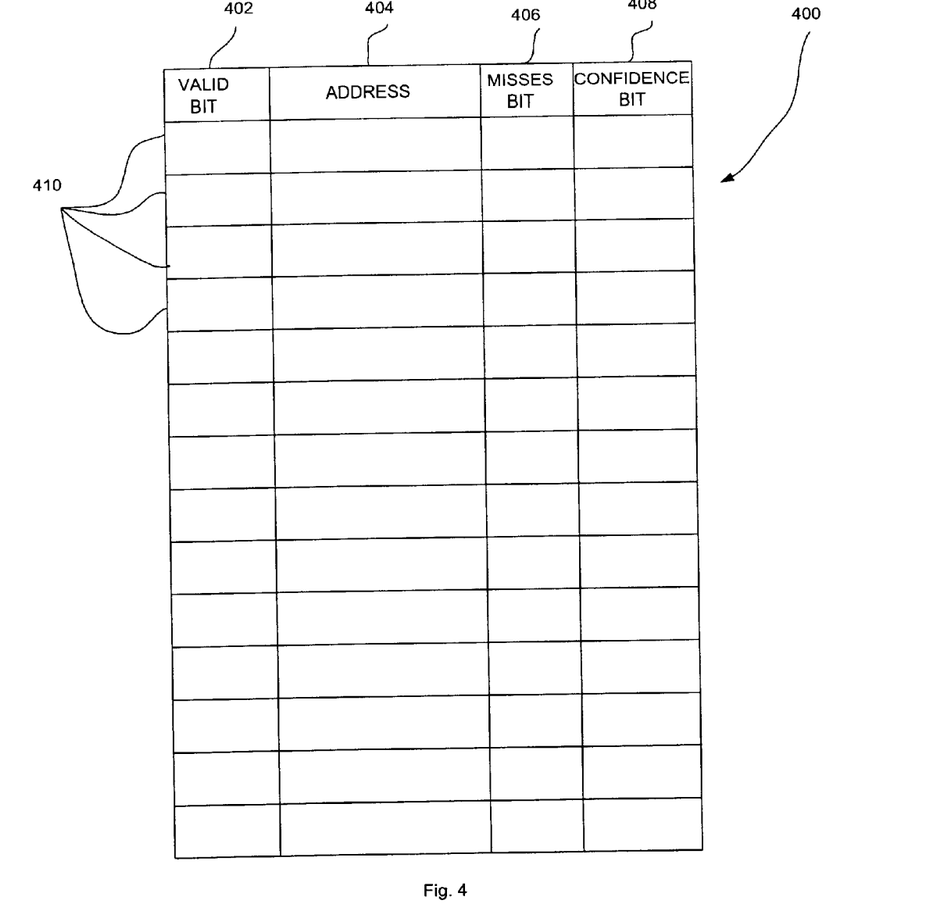
FIG. 4 illustrates a data structure used to facilitate operation of the prefetcher module of FIG. 2.

FIG. 4 illustrates a data structure 400 used to facilitate operation of the prefetcher module 208 of FIG. 2. In particular, such data structure 400 facilitates the predictor module 302 in tracking the success of the predictions using numerous variables. For example, a valid variable 402, an address identifier variable 404, a misses variable 406, and a confidence bit variable 408 are all monitored during the course of use of the present invention. It should be noted that the data structure 400, along with the ability to match an incoming request address with any address 404 allows the present invention to detect hits on multiple outstanding speculative requests. It should be noted that the valid variable 402 in the data structure 400 is merely an option, and may be deleted per the desires of the user.

Information associated with each of the foregoing variables is stored for a plurality of streams of processor requests that are initiated by the processor 202. In particular, the predictor module 302 of the prefetcher module 208 predicts future processor requests for information in certain memory addresses, where such addresses are stored using the address identifier variable 404. Further, the status of such prediction is monitored using the remaining variables 404, 406, and 408. It should be noted that each row 410 corresponds to a speculated request, of which there may be one or more per stream.

Figure 5:
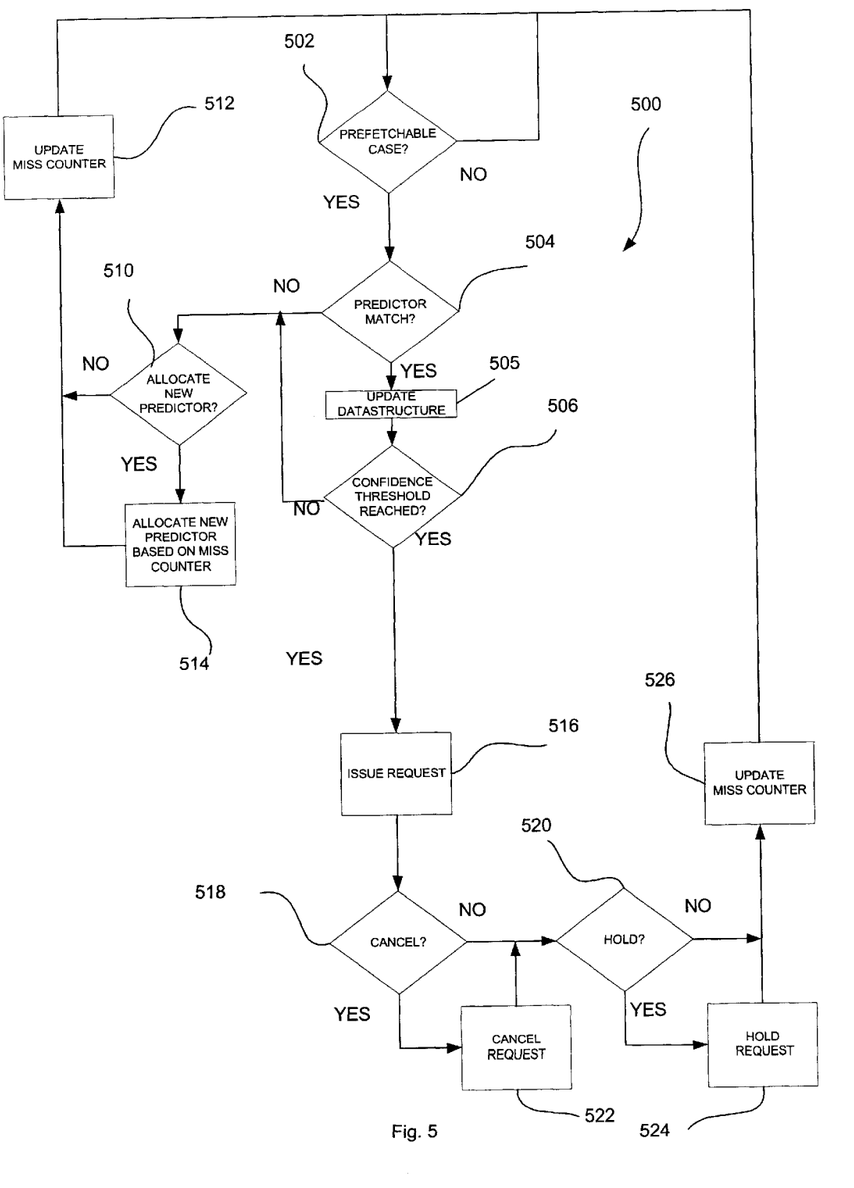
FIG. 5 is a flowchart showing the operation of the predictor module as governed by the control module of FIG. 3.

FIG. 5 is a flowchart 500 showing the operation of the predictor module 302 as operated by the control module 308 of FIG. 3. In use, the predictor module 302 monitors the system bus 206 of FIG. 2 for the purpose of observing processor requests made by the processor 202 which result in information being retrieved from the DRAM 209. Upon start-up, the predictor module 302 populates the data structure 400 with addresses corresponding to predicted future processor requests made in accordance with prediction algorithms. Further, the variables 402, 406, and 408 associated with the addresses may all be preset to "0."

In the context of the present invention, any one or more of the numerous available predictor algorithms may be employed. For example, if it is seen that the processor 202 has called information at memory addresses 100, 140, 180, and 220 in sequential order in any one or more of n streams, it may be reasonably predicted that information at memory address 260 will be called next, and so on. Further examples of such algorithms may include an algorithm that utilizes branch predictions to predict irregular strides in processor requests, or an algorithm that determines a difference between a first and second processor request and predicts future processor requests based on such difference. Still yet, the predicted addresses may be at positive or negative displacements, at strides greater than 1 cache line, and/or at successive displacements of differing magnitudes. It should be noted that any particular known predictor algorithm may be employed per the desires of the user.

As shown in FIG. 5, such process starts by first determining in decision 502 whether the present request is a prefetchable case. Table 1 illustrates a list of exemplary prefetchable cases, and exemplary commands associated therewith. It should be understood that such list is not deemed to be exhaustive, and is merely illustrative in nature. Decision 502 may be used in any desired manner to limit the number and type of requests to be monitored for prediction purposes.

Table 1

CODE enables code access prefetches. #instruction fetches

DATA enables data access prefetches

WB enables write back memory access prefetches.

WT enables write through memory access prefetches.

WP enables write protected memory access prefetches.

UC enables uncachable memory access prefetches.

WC enables write combining memory access prefetches.

It should be noted that in addition to meeting at least one of the foregoing prefetchable cases, the request must be 1) for a memory read, and 2) for an entire cache line in the DRAM 209. If the current request fails to meet such criteria as determined by decision 502, the predictor module 302 polls until another request arrives. It should be noted that, in one embodiment, the present invention may be adapted to prefetch only memory, and only full cache lines.

Once it has been determined in decision 502 that the criteria has been met, it is then determined whether there is a predictor match in decision 504. A predictor match refers to the situation where one of the addresses identified in the data structure 400 is called by the processor 202.

If a predictor match is affirmed in decision 504, the data structure 400 may be updated in operation 505. In particular, the valid variable 402 associated with the appropriate address may be changed to "1." Further, the matched address in data structure 400 is replaced with another address using the prediction algorithm which generated the previous match.

Also in operation 505, the confidence bit variable 408 may be altered to reflect a confidence that the associated predictor algorithm is generating favorable results. In particular, the confidence bit variable 408 may be incremented upon certain criteria being met regarding the confidence as to whether any of the memory addresses delineated in data structure 400 of FIG. 4 is likely to be the subject of a future processor request. More particularly, the confidence bit variable 408 may be incremented by "1" every time the associated address is called.

Referring still to FIG. 5, it is then determined whether a confidence threshold is reached in decision 506. To determine whether the confidence threshold is reached, the confidence bit variable 408 of the data structure 400 of FIG. 4 may be compared against a threshold value. In one embodiment, the threshold value may be adjustable and user-configurable. As will soon become apparent, this allows the present invention to be "throttled."

Upon there being no predictor match in decision 504 or the confidence threshold not being reached in decision 506, it is determined in decision 510 as to whether a new predictor should be allocated. This refers to the process of altering, resetting, and/or changing the corresponding prediction algorithm to generate a new predicted address for a particular information stream, and updating the data structure 400. To make the appropriate determination in decision 504, the misses variable 406 of the data structure 400 is utilized in a manner that will soon be set forth.

If it is determined in decision 510 that a new predictor should not be allocated, the misses variable 406 of the data structure 400 of FIG. 4 may be updated in operation 512. In use, the misses variable 406 indicates a number of instances a predicted future processor request was not actually called by the processor 202.

More specifically, the misses variable 406 indicates the number of times a prefetchable address was presented by the processor 202, but was not the predicted address in question. The reason for this mechanism is to prevent discarding the predicted address prematurely in the event that there are more data streams presented by the processor 202 than there are predicted addresses tracked by the present invention. In other words, this may be construed as an "anti-thrash" mechanism.

If it is determined in decision 510 that a new predictor should indeed be allocated, such may be accomplished in operation 514 based on the miss counter variable 406 of the data structure 400 of FIG. 4. In particular, the new predictor may be allocated upon the miss counter variable 406 indicating a predetermined number of misses. As mentioned earlier, predictor allocation may include replacing an address that failed the match decision 504 with a new address generated by the predictor module 302. By tracking the misses variable 406 and replacing the addresses accordingly, a more efficient prediction system is afforded.

Figure 6:
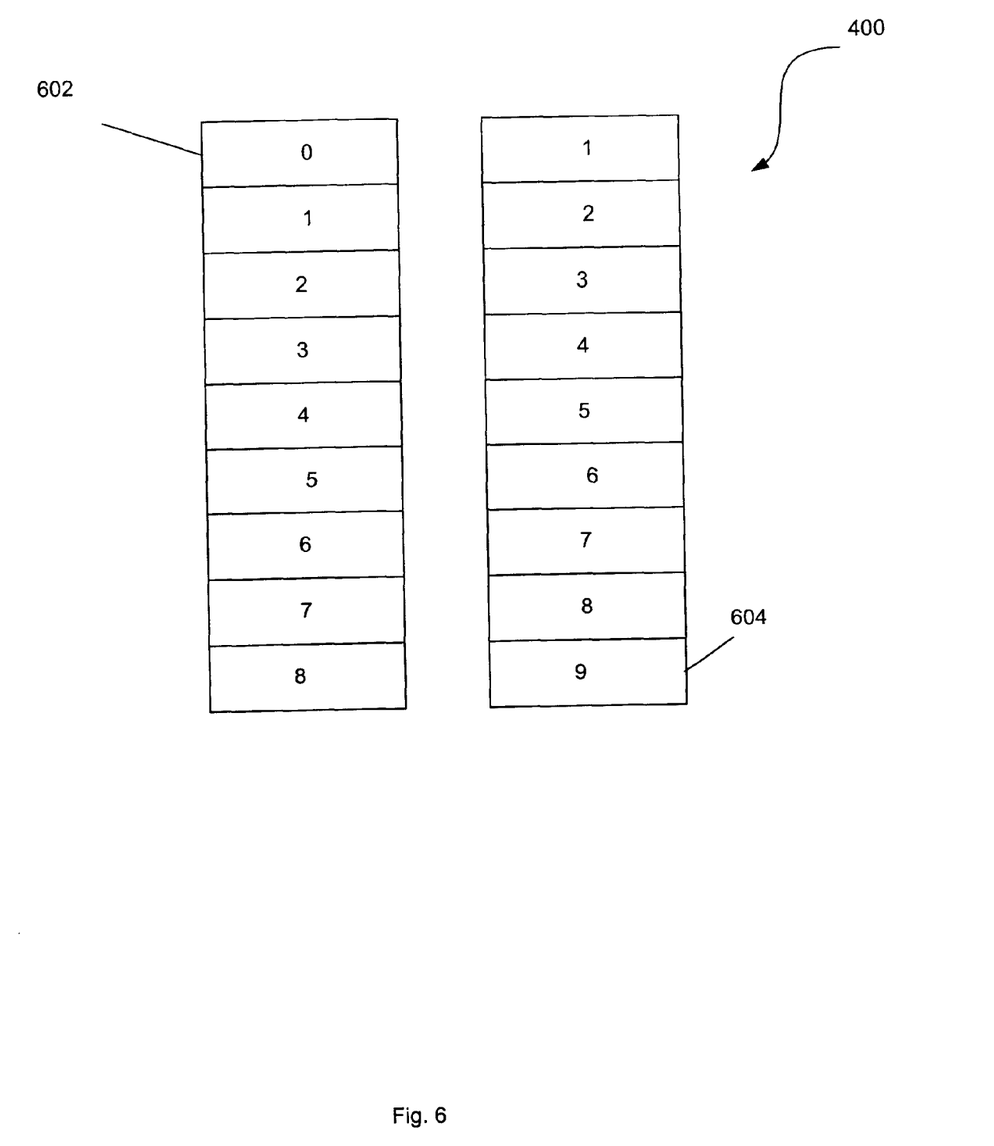
FIG. 6 illustrates the manner in which predicted addresses are moved in the data structure of FIG. 4 during use.

FIG. 6 illustrates the manner in which predicted addresses are moved in the data structure 400 of FIG. 4 to facilitate the allocation of new predictors, in accordance with decision 510 of FIG. 5. Upon an address being the subject of a match in decision 504, it is moved to the bottom of the data structure 400. By doing this, the addresses most suitable to be replaced are inherently moved to the top of the data structure 400.

As such, the predictor module 302 may assume that the topmost address is that which has the most misses, and such address may be the subject of a test as to whether its associated misses exceed a predetermined amount in accordance with operation 514 of FIG. 5. If such test is successful, the most suitably replaceable address (see 602 in FIG. 6) may be deleted, and a new predictor address (see 604 in FIG. 6) may be entered on the bottom of the data structure 400.

With reference still to FIG. 5, once the confidence threshold is determined to be reached in decision 506, a request may be issued to retrieve the appropriate information from the DRAM 209. Note operation 516. Such requests retrieve information from the DRAM 209 that corresponds to an address which was the subject of a predictor match and a sufficient confidence threshold (see decisions 504 and 506, respectively). As is now apparent, a user may throttle the operation of the predictor module 302 by manipulating the confidence threshold. In other words, the total amount of speculative requests issued may be controlled by selectively setting the confidence threshold.

In a preferred embodiment, multiple requests may be issued at operation 516. In the context of one of the exemplary prediction algorithms set forth hereinabove, if it is seen that the processor 202 has called information at memory addresses 100, 140, 180, and 220 in sequential order, addresses 260, 300, and 340 may be called concurrently. Of course, the multiple requests may call addresses in any manner prescribed by the appropriate prediction algorithm.

By allowing multiple memory requests to be issued from the same prediction algorithm, memory throughput is improved since the number of times the memory must switch the active page is reduced. So, if one has two streams (A and B), allowing multiple requests can result in the speculative requests stream A0, A1, B0, B1. This results in one page activation per two requests. Without multiple speculative requests one would get A0, B0, A1, B1 which would result in one page activation per request. This is true whether or not a "hit" is made in flight.

In another embodiment, the number of requests issued may be programmable and/or user-specified. With the information retrieved from the DRAM 209, it may be cached in the memory cache 306 for being retrieved in response to a future processor request. More information regarding such process will be set forth later during reference to FIG. 8.

After the request(s) has been issued, a cancel or hold signal may be received from the data return module 304 via the memory controller 207, as determined by decisions 518 and 520, respectively. It should be noted that any type of signal may be used to prevent processing of speculative requests from delaying future processor requests. In response to such signals, the request may be cancelled or held in operations 522 and 524, respectively, for reasons that will be elaborated upon later. In any case, the misses variable 406 of the data structure 400 of FIG. 4 may be updated in operation 526. Such update may include resetting the misses variable 406.

Figure 7:
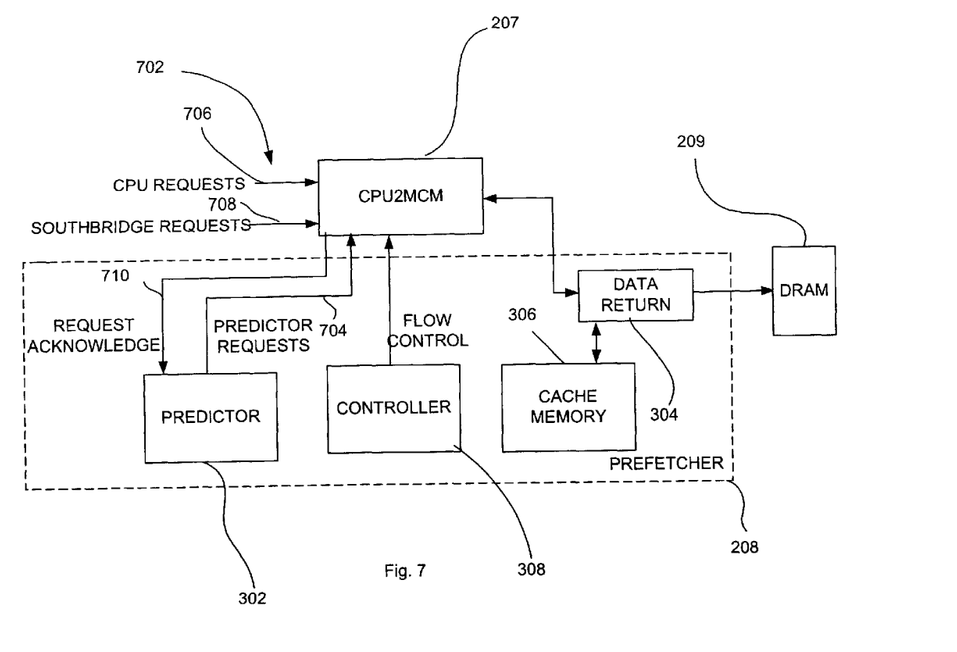
FIG. 7 shows the interface between the control module, memory controller, and the data return module.

FIG. 7 shows the interface between the control module 308, the memory controller 207, and the data return module 304, along with other control signal inputs 702 associated therewith. Such control signal inputs 702 include a predictor requests line 704 for receiving the requests from the predictor module 302 issued in operation 516 of FIG. 5. Also included is a processor request line 706 for receiving requests from the processor 202. Still yet, other request lines 708 may be included for receiving requests to access the DRAM 209 from other sources, i.e. a Southbridge.

The memory controller 207 also includes a control signal output 710 for issuing the hold and cancel signals mentioned earlier during reference to decisions 518 and 520 in FIG. 5. In one embodiment, the hold and cancel signals may be issued upon a total number of requests received over the control signal inputs 702 reaching a predetermined amount. Further, the control module 308 of the prefetcher module 208 may also work in conjunction with the memory controller 207 to initiate the issuance of the hold and cancel signals.

To this end, the hold and cancel signals serve as a regulator for the speculative requests. This is important for accelerating, or "throttling," operation when the memory subsystem is under-utilized, and preventing the number of speculative requests from slowing down operation when the memory subsystem is over-utilized. Further, such capability is important for giving preference to processor requests. It should be noted that speculation is carefully managed in order to avoid adding latency penalties. In one embodiment, the throttle mechanism of the present invention may be table driven. Separate tables, one for the processor 202, and one for all memory clients (i.e. DRAM 209), may be used to facilitate such management.

In further embodiments, the present invention may be "throttled" based on various factors. For example, the speculative requests may be selectively deferred if the total number of the processor requests exceeds a predetermined amount, or if a number of information streams exceeds a predetermined amount. Such predetermined amount may be determined based on a capacity of the hardware associated with the prefetcher module 208.

In operation, the memory controller 207 sends requests to the data return module 304 of the prefetcher module 208 for the purpose of accessing information in the DRAM 209. More information regarding the operation of the data return module 304 will be set forth in greater detail during reference to FIG. 9.

Figure 8:
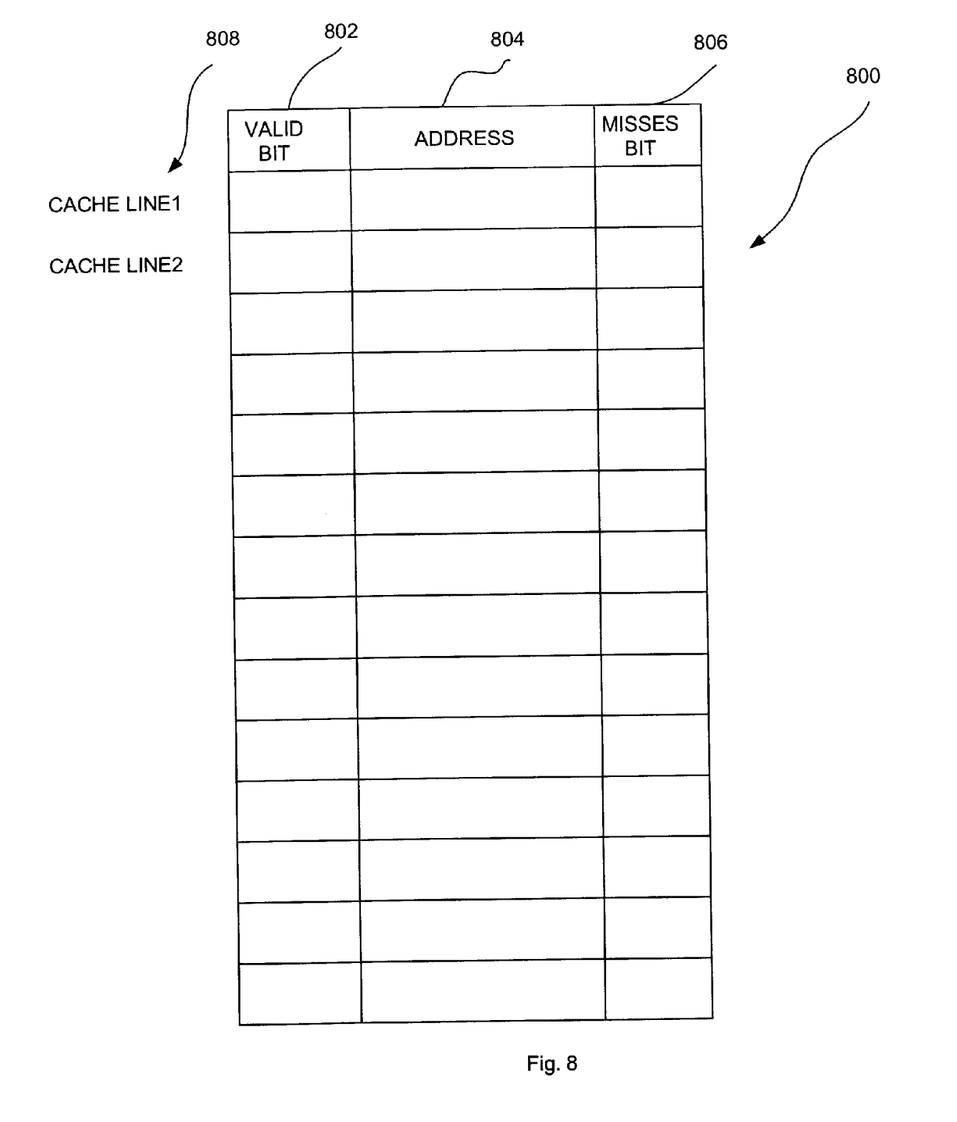
FIG. 8 illustrates a data structure used to facilitate operation of the data return of the prefetcher module of FIG. 2.

FIG. 8 illustrates a data structure 800 used to facilitate operation of the data return module 304 of the prefetcher module 208 of FIG. 2. Such data structure 800 facilitates the data return module 304 in tracking the processor requests made by the processor 202 and the content of the cache memory 306 using numerous variables. Specifically, a valid variable 802, an address identifier variable 804, and a misses variable 806 are all monitored during the course of use of the present invention. The address identifier variable 804 is used to identify the information stored in the cache memory 306, while the remaining variables are used to track whether the information stored in the cache memory 306 has been called by the processor 202.

Figure 9:
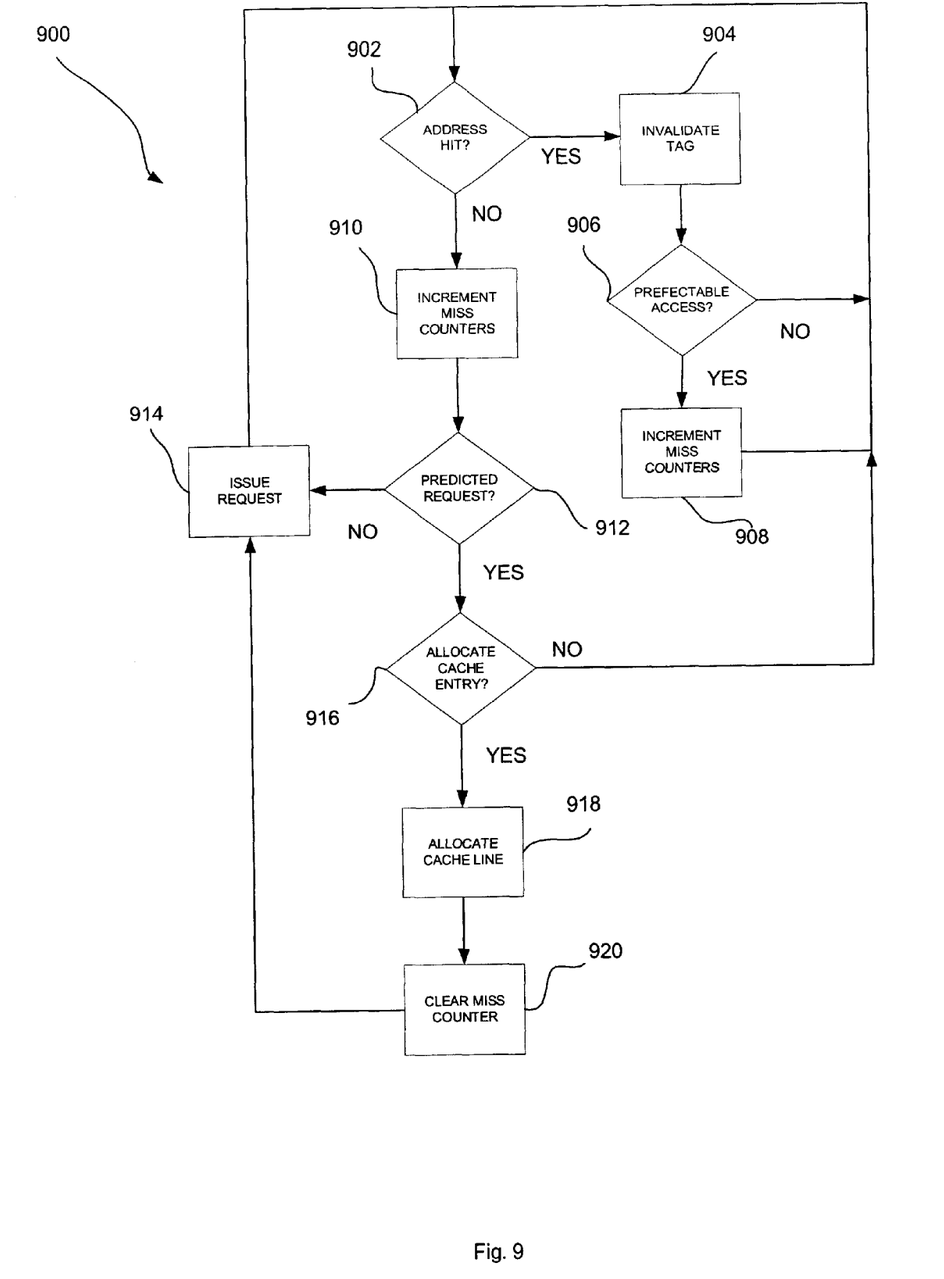
FIG. 9 is a flow diagram illustrating the operation associated with the data return module of the prefetcher module.

FIG. 9 is a flow diagram illustrating the process 900 associated with the data return module 304 of the prefetcher module 208. As shown, the data return module 304 monitors the processor requests in decision 902. While this is being carried out, the various variables of the data structure 800 of FIG. 8 are updated. In particular, if it is determined in decision 902 that a current processor request matches one of the addresses identified by the address identifier variables 804 of the data structure 800, it is concluded that an "address hit" has occurred.

In response to an address hit, the valid variable 802 of the data structure 800 is set to indicate that the associated address is invalid. Note operation 904. This is done for the purpose of tagging the corresponding information for removal from cache memory 306. Thereafter, it is determined whether the present case is a prefetchable case in decision 906. This may be accomplished using the same criteria set forth hereinabove in Table 1. If it is determined that the present case is not prefetchable, the loop is returned to decision 902. If, on the other hand, it is determined that the information involved in the present case is prefetchable, the miss counter variable 806 of data structure 800 may be incremented for each of the other addresses in the data structure 800. Note operation 908.

Returning to decision 902, the miss counter variable 806 associated with all of the addresses represented by the data structure 800 may be incremented in operation 910 if it is determined that there is no address hit. It may then be determined in decision 912 whether the request is a processor request, or the predictor module 302 has issued the request. If it is a processor request, the appropriate information may be read from the DRAM 209 in a conventional manner in operation 914.

If it is determined in decision 912 that the request is a speculative request, it is then decided whether a cache entry may be allocated. See decision 916. Whether or not an entry may be allocated may be based on whether there is available space in the cache memory 306, or whether there is a current address that may be replaced due to it having a predetermined number of misses according to its associated misses variable 806 of the data structure 800.

If the cache entry cannot be allocated, the process loops to operation 902. On the other hand, the cache line may be allocated in operation 918. More information regarding the allocation of the cache entry in accordance with operation 918 will be set forth in greater detail during reference to FIG. 10. Once the cache line is allocated, the associated valid bit may be set to "1," and the corresponding miss bit variable 802 of the data structure 800 may be reset. See operation 920. This way, the request for the information may be issued in operation 914 such that it may be stored in the allocated entry in cache memory 306.

Figure 10:
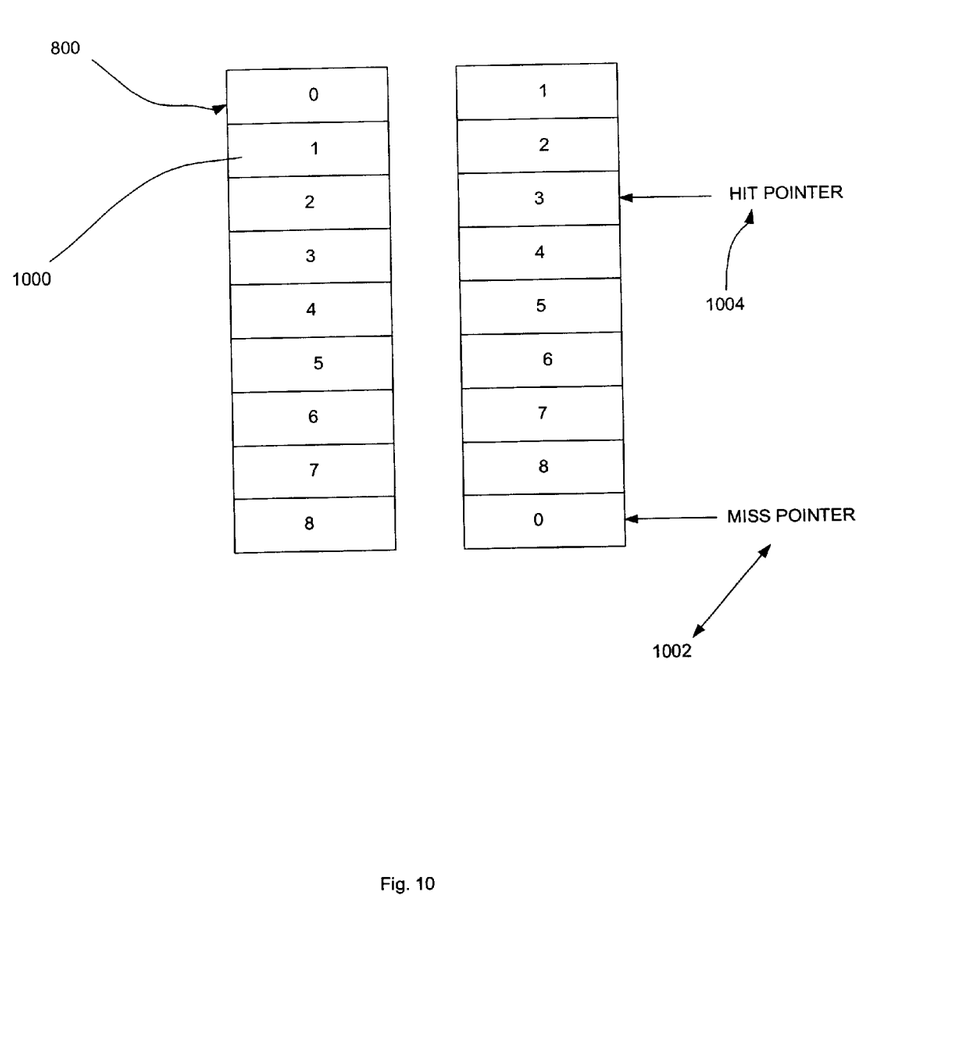
FIG. 10 illustrates the manner in which the retrieved information associated with the predicted addresses is moved in the data structure of FIG. 8.

FIG. 10 illustrates the manner in which the retrieved information associated with the predicted addresses is moved in the data structure 800 of FIG. 8. As shown, the data structure 800 includes a plurality of entries 1000 which are filled by the prefetcher module 208 of the present invention. One goal of the present allocation procedure is to replace information that has already been called by the processor 202, and further replace information that has not been called by the processor 202 for an extended number of processor requests. This may be accomplished by way of a speculative address pointer 1002, a hit pointer 1004, and a specific shifting routine.

In use, any address that has been "hit" is moved to the top of the data structure 800. Further, the hit address lowest in the data structure 800 is marked using the hit pointer 1004. In the case of the data structure 800 of FIG. 10, the hit pointer 1004 would indicate that addresses 1–3 are marked for removal. On the other hand, if a "miss" occurs, the associated address is moved to the bottom of the data structure 800, and the speculative address pointer 1002 is moved accordingly to mark the speculative address highest in the data structure 800. Note FIG. 10, wherein address 0 is marked as a miss.

Figure 11:
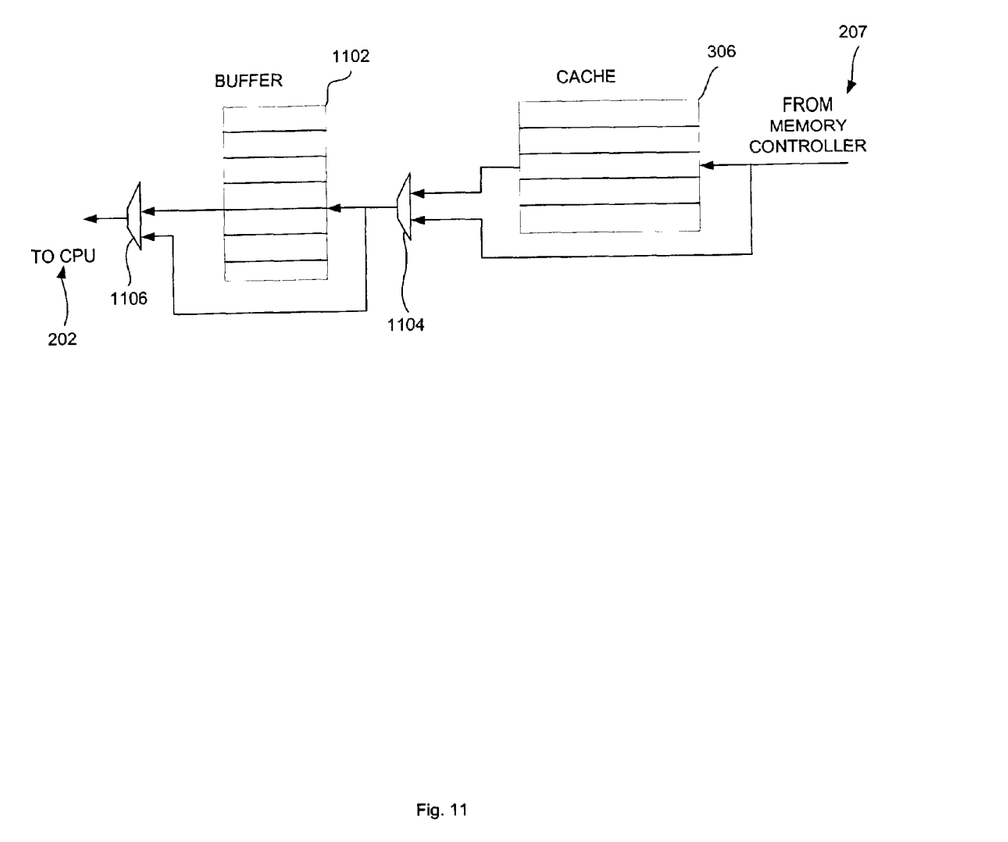
FIG. 11 is an illustration showing an interface between the memory controller, cache memory, and processor, in accordance with one embodiment of the present invention.

FIG. 11 is an illustration showing an interface between the memory controller 207, cache memory 306, and processor 202. As shown, the cache memory 306 is coupled to the memory controller 207. Both the cache memory 306 and the memory controller 207 are connected to a buffer 1102 by way of a first multiplexer 1104 coupled there between. Further, the buffer 1102 and an output of the first multiplexer 1104 is further coupled to the processor 202 via a second multiplexer 1106.

In use, the buffer 1102 operates by queuing requested information received from the cache memory 306 and the DRAM 209 via the first multiplexer 1104. Further, the processor 202 may receive information directly from the cache memory 306 and the DRAM 209 via the first multiplexer 1104, or from the buffer 1102 via the second multiplexer 1106.

Many optimizations may be implemented to facilitate operation of the components in FIG. 11. One issue of concern arises when requested information arrives at the cache 306 in an order that is different from that in which the corresponding processor requests were made by the processor 202. One solution to such concern is to utilize the multiplexers of FIG. 11 to bypass the cache memory 306 and/or buffer 1102 in cases where information must be retrieved with varying priority. Further, sub-block ordering may be employed to ensure that the processor requests are fulfilled in a proper order.

One particular situation of concern involves cases where the processor 202 issues a processor request for information that is currently being retrieved as a result of a request by the predictor module 302, but has not even been retrieved from the DRAM 209 yet. In such case, the requested information must circumvent the cache memory 306 via the first multiplexer 1104 for delivery directly to the processor 202.

Another situation arises wherein the order in which the predictor module 302 retrieves information from the DRAM 209 is different from that dictated by the processor requests. In such situation, a portion of the information may be stored in the cache memory 306 or the buffer 1102 for the purpose of allowing the following information to bypass directly to the processor 202 via the multiplexers 1104 and 1106. Thereafter, the information stored in the cache memory 306 or the buffer 1102 may be retrieved by the processor 202 in the appropriate order.

Yet another case where problems occur is during the use of processors 202 which require advance notice of incoming information that was previously requested. Since such incoming information may actually be delayed by the various techniques of the present invention, one solution is to delay any notice of incoming information by a predetermined number of clock cycles.

In other words, for some processors, a CPU bus request may be initiated before the data is put on the bus. Special circuitry may manage advance warning of returning data, derived by forwarded control information from a DRAM controller itself, or alternately from the prefetcher controller 308 if the data is coming from the prefetcher cache 306.

In order to make the most efficient use of data storage, it may be desirable to issue a speculative request before there is space in the cache for the data. This can lead to the situation where information from memory is destined for a particular cache location, but the previous contents of that location have not yet been called by the CPU. This may be the result of any type of latency in the system. In such case, there is a risk of overwriting the information in the cache memory 306 before it is transferred. As such, flow control must be employed which tracks the information to prevent the premature loss thereof.

To facilitate such control, various data may be tracked on all processor and predictor module requests. Various parameters that are tracked include the cache-line index where the information is stored, the size of the information, and any other required information. During use, such information may be utilized to control the multiplexers 1104 and 1106.

To allow full concurrency between incoming memory data and outgoing processor requested data, two queues may be employed. One queue, the CRQ, may be used to track processor requests and maintain information on where the requested data will be served from. The DRQ may be used to track all memory requests and maintain information on what to do with the data when it returns. These two queues may together also tell the processor if and when data for a request is ready to be returned. In one embodiment, one cache-line of storage may be permanently allocated for each DR To conserve on data request tracking resources, it may be useful to deliver data from the cache 306 to the buffer 1102 at the earliest opportunity, so that the data request tracking resources may then be used for incoming CPU requests.

One optional rule that may be implemented for optimization purposes is to allow the predictor module 302 to only have one speculative request outstanding. However, as soon as that speculative request becomes a hit, a new speculative request can be issued. A second fundamental rule may be that only one hit be allowed per predicted address.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for retrieving information from memory, comprising:

monitoring processor requests for information from a first memory;

predicting a predicted future processor request for information based on the monitoring;

issuing multiple speculative requests for retrieving information from the first memory in accordance with the prediction;

caching the retrieved information in a second memory for being retrieved in response to processor requests without accessing the first memory; and determining a total number of the processor requests, and conditionally issuing the speculative requests if the total number of the processor requests exceeds a predetermined non-zero amount.

2. The method as recited in claim 1, and further comprising tracking a status of the speculative requests using a data structure, and conditionally issuing the speculative requests based on the data structure.

3. The method as recited in claim 1, and further comprising determining whether the predicted future processor request has occurred.

4. The method as recited in claim 3, and further comprising adjusting the predicting if the predicted future processor request has not occurred.

5. The method as recited in claim 4, and further comprising determining a total number of instances that the predicted future processor request has not occurred, and conditionally issuing the speculative requests if the total number of the instances exceeds a predetermined amount.

6. The method as recited in claim 5, wherein each instance of the predicted future processor request is associated with one of a plurality of addresses.

7. The method as recited in claim 5, wherein each instance of the predicted future processor request is associated with one of a plurality of information streams.

8. The method as recited in claim 4, wherein a miss variable is used to track whether the predicted future processor request has occurred.

9. The method as recited in claim 1, and further comprising determining a confidence associated with the predicted future processor request, and issuing the speculative requests based on the confidence.

10. The method as recited in claim 9, wherein the confidence is compared to a confidence threshold value, and the speculative requests are issued based on the comparison.

11. The method as recited in claim 10, wherein the confidence threshold value is programmable.

12. The method as recited in claim 9, wherein a confidence variable is used to track the confidence.

13. The method as recited in claim 1, wherein a plurality of the predicted future processor requests are predicted for each of a plurality of information streams.

14. The method as recited in claim 13, wherein the speculative requests are deferred when a number of information streams exceeds a predetermined amount.

15. The method as recited in claim 14, wherein a plurality of speculative requests is issued for each of the information streams.

16. The method as recited in claim 1, wherein the information includes graphics information.

17. The method as recited in claim 1, wherein the first memory includes dynamic random access memory (DRAM), and the second memory includes cache memory.

18. The method as recited in claim 1, wherein the speculative requests retrieve information from predicted addresses in the first memory at positive displacements.

19. The method as recited in claim 1, wherein the speculative requests retrieve information from predicted addresses in the first memory at negative displacements.

20. The method as recited in claim 1, wherein the speculative requests retrieve information from the first memory at strides greater than one (1) cache line.

21. The method as recited in claim 1, wherein the speculative requests retrieve information from the first memory at successive displacements of differing magnitudes.

22. The method as recited in claim 1, wherein delivery of information from the first memory to the second memory and delivery of information from the second memory to a processor are concurrent.

23. The method as recited in claim 22, wherein a status of the speculative requests and processor requests are tracked in separate data structures using associated control logic for facilitating the concurrency of the deliveries.

24. The method as recited in claim 1, wherein the retrieved information is buffered for versatile delivery to a processor.

25. The method as recited in claim 1, wherein the second memory is situated on a Northbridge.

26. The method as recited in claim 1, wherein a speculative request which is the subject of a match is moved in a data structure for optimization purposes.

27. The method as recited in claim 1, and further comprising flow control means for facilitating deferred allocation of the second memory to minimize storage requirements.

28. The method as recited in claim 1, wherein the multiple speculative requests are matched with multiple processor requests.

29. A method for retrieving information from memory, comprising:

monitoring processor requests for information from a first memory;

predicting a predicted future processor request for information based on the monitoring;

issuing multiple speculative requests for retrieving information from the first memory in accordance with the prediction;

caching the retrieved information in a second memory for being retrieved in response to processor requests without accessing the first memory; and determining a total number of the processor requests, and conditionally issuing the speculative requests if the total number of the processor requests exceeds a predetermined non-zero amount;

wherein the speculative requests are conditionally issued in order to prevent processing of speculative requests from delaying predicted future processor requests.

30. The method as recited in claim 29, wherein the speculative requests are conditionally issued based on at least one of a hold signal and a cancel signal.

31. A computer program product for retrieving information from memory, comprising:

(a) computer code for monitoring processor requests for information from a first memory;

(b) computer code for predicting a predicted future processor request for information based on computer code segment (a);

(c) computer code for issuing multiple speculative requests for retrieving information from the first memory in accordance with the prediction;

(d) computer code for caching the retrieved information in a second memory for being retrieved in response to processor requests without accessing the first memory; and (e) computer code for determining a total number of the processor requests, and conditionally issuing the speculative requests, if the total number of the processor requests exceeds a predetermined non-zero amount.

32. A system for retrieving information from memory, comprising:

(a) logic for monitoring processor requests for information from a first memory;

(b) logic for predicting a predicted future processor request for information based on logic unit (a);

(c) logic for issuing multiple speculative requests for retrieving information from the first memory in accordance with the prediction;

(d) logic for caching the retrieved information in a second memory for being retrieved in response to processor requests without accessing the first memory; and (e) determining a total number of the processor requests, and conditionally issuing the speculative requests if the total number of the processor requests exceeds a predetermined non-zero amount.

33. A method for retrieving information from memory, comprising:

monitoring processor request for information from a first memory;

predicting a future processor request for information based on the monitoring;

adjusting the predicting if the predicted future processor request has not occurred;

issuing multiple speculative requests for retrieving information from the first memory in accordance with the prediction;

determining a total number of the speculative requests, and conditionally issuing the speculative requests ii the total number of the speculative requests exceeds a predetermined amount;

tracking a status of the speculative requests using a data structure, and conditionally issuing the speculative requests based on the data structure;

determining a total number of instances that the predicted future processor request has not occurred, and conditionally issuing the speculative requests if the total number of the instances exceeds a predetermined amount, wherein each instance of the predicted future processor request is associated with one of a plurality of addresses and one of a plurality of information streams, and a miss variable is used to track whether the predicted future processor request has occurred;

determining a confidence associated with the predicted future processor request, and issuing the speculative requests based on the confidence, wherein the confidence is compared to a confidence threshold value, and the speculative requests are issued based on the comparison, the confidence threshold value being programmable;

caching the retrieved information in a second memory for being retrieved in response to processor requests without accessing the first memory;

determining a total number of the processor requests, and conditionally issuing the speculative requests if the total number of the processor requests exceeds a predetermined amount; and determining whether the information in the second memory has been retrieved by the processor requests, and replacing the information if the information in the second memory has not been retrieved, wherein a variable is used to track whether the information in the second memory has been retrieved by the processor requests;

wherein the speculative requests are conditionally issued in order to prevent processing of speculative requests from delaying predicted future processor requests, the speculative requests are conditionally issued based on at least one of a hold signal and a cancel signal;

wherein a plurality of the predicted future processor requests are predicted for each of a plurality of information streams, the speculative requests are deferred when a number of information streams exceeds a predetermined amount, and a plurality of speculative requests is issued for each of the information streams;

wherein the information includes graphics information;

wherein the first memory includes dynamic random access memory (DRAM), and the second memory includes cache memory;

wherein the speculative requests retrieve information from predicted addresses in the first memory at positive displacements and at negative displacements;

wherein the speculative requests retrieve information from the first memory at strides greater than one (1) cache line;

wherein the speculative requests retrieve information from the first memory at successive displacements of differing magnitudes;

wherein delivery of information from the first memory to the second memory and delivery of information from the second memory to a processor are concurrent;

wherein a status of the speculative requests and processor requests are tracked in separate data structures using associated control logic for facilitating the concurrency of the deliveries;

wherein the retrieved information is buffered for versatile delivery to a processor;

wherein the second memory is situated on a Northbridge.

* * * * *

UNITED STATES PATENT AND TRADEMARK OFFICE
CERTIFICATE OF CORRECTION

| | | |
|---|---|---|
| PATENT NO. | : 6,820,173 B1 | Page 1 of 1 |
| APPLICATION NO. | : 09/791417 | |
| DATED | : November 16, 2004 | |
| INVENTOR(S) | : Bittel et al. | |

It is certified that error appears in the above-identified patent and that said Letters Patent is hereby corrected as shown below:

In the claims:
Col. 14, line 25, claim 33, please replace "request" with --requests--;
Col. 14, line 37, claim 33, please replace "ii" with --if--.

Signed and Sealed this
Twenty-sixth Day of July, 2011

David J. Kappos
*Director of the United States Patent and Trademark Office*